Figure 1:
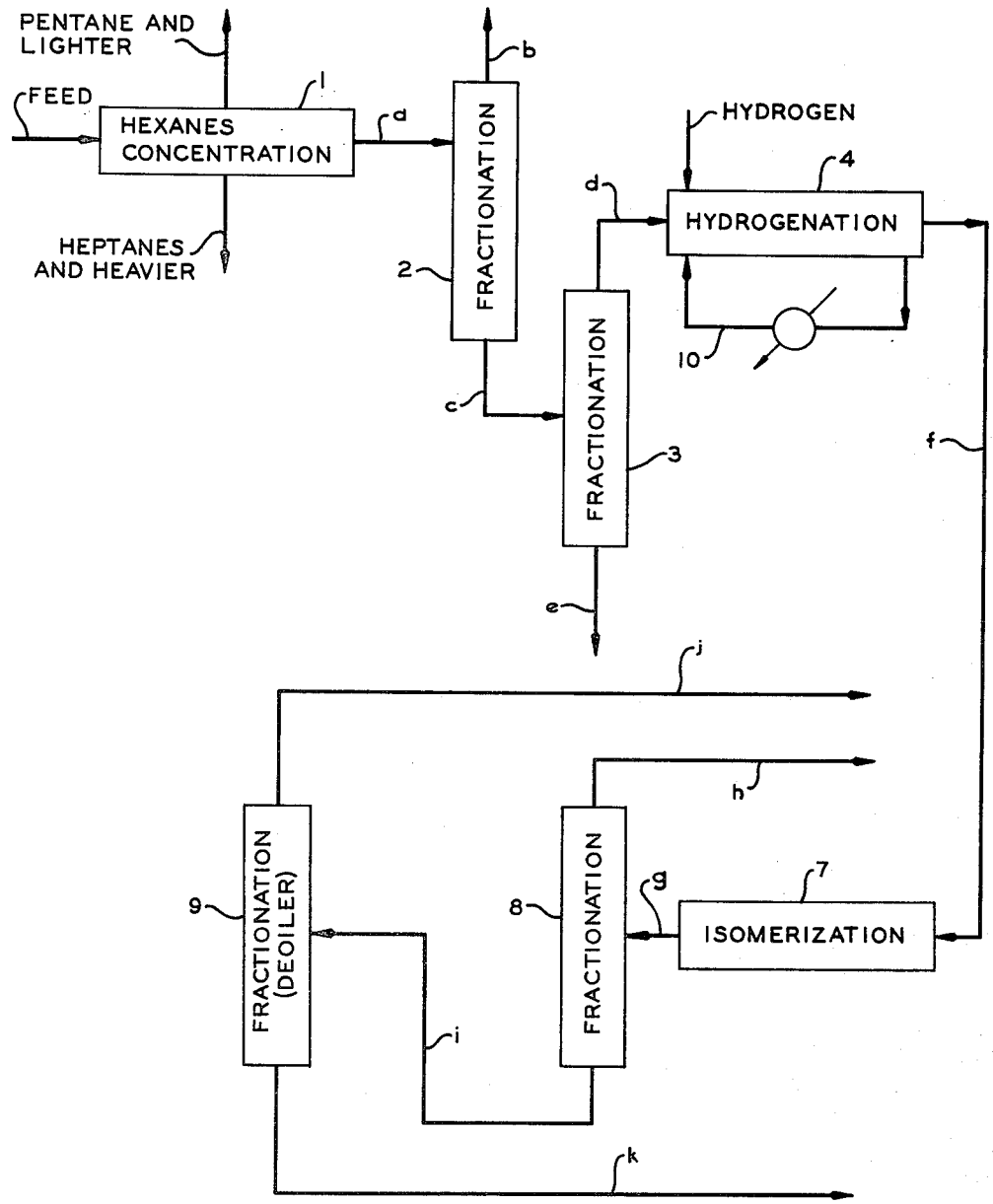

INVENTOR.
J. T. CABBAGE
BY Young & Quigg
ATTORNEYS

May 10, 1966      J. T. CABBAGE      3,250,819
ISOMERIZATION PROCESS FOR FORMING A CYCLOPARAFFIN
Filed Sept. 14, 1964      2 Sheets-Sheet 2

INVENTOR.
J.T. CABBAGE
BY Young & Quigg
ATTORNEYS

United States Patent Office 3,250,819
Patented May 10, 1966

3,250,819
ISOMERIZATION PROCESS FOR FORMING
A CYCLOPARAFFIN
John T. Cabbage, Bartlesville, Okla., assignor to Phillips
Petroleum Company, a corporation of Delaware
Filed Sept. 14, 1964, Ser. No. 396,008
6 Claims. (Cl. 260—666)

This invention relates to a method and apparatus for the production of cycloparaffins.

Heretofore high purity cycloparaffins have been produced by first deisohexanizing a hydrocarbon concentrate rich in hydrocarbons containing 6 carbon atoms followed by hydrogenation and aluminum halide complex isomerization operations. This system has the disadvantage that when isohexane is removed by fractionation from the above concentrate, methylcyclopentane and normal hexane, both of which boil very closely to isohexane, are also removed. Normal hexane azeotropes with benzene, a very desirable constituent for producing cycloparaffins, and therefore when the normal hexane is removed with the isohexane a certain amount of benzene is lost and therefore not available for conversion into the desired cyclohexane product. Also, this system has the disadvantage that the aluminum halide complex isomerization operation, which is an expensive operation, bears the entire isomerization load for the system and, being hydrocarbon soluble, is used up or removed faster than is necessary to effect the desired reaction.

It has now been found that by omitting the initial deisohexanizing step and by inserting between the hydrogenation and aluminum halide complex isomerization operations a fixed bed isomerization operation followed by a deisohexanization step both benzene and methylcyclopentane present in the original feed are conserved to a greater extent than before and therefore an increase in the output of the system is realized. In addition, this invention increases the quantity and purity of desirable byproducts such as isohexane since the deisohexanization step follows a fixed bed isomerization operation and since there is no benzene present, due to the prior hydrogenation, to be azeotroped and removed with normal hexane. Also, the volume of feed to the aluminum halide complex isomerization operation is reduced without reducing the amount of cyclohexane produced and, therefore, the operating efficiency and cost is reduced by utilizing the aluminum halide isomerization step to a lesser degree than before for a given amount of cycloparaffin produced. The lesser volume of feed to the aluminum halide complex isomerization operation reduces costly catalyst consumption due to dissolution in the hydrocarbons present. Thus, by this invention, not only is there effected an increased yield of a higher purity product with a contemporaneous reduction in overall investment and operating costs but there is also produced an increased amount of higher purity primary product along with an increased amount of high purity secondary high octane constituents. The secondary high octane constituents are well suited to blending with other gasoline constitutents to produce high quality motor fuels. Finally, by the use of this invention a lower overall load placed on the aluminum halide complex isomerization operation allows for a reduction in size of that apparatus without a decrease, and even with an increase, of primary product output.

Accordingly, it is an object of this invention to provide a method and apparatus whereby an increased yield of a high purity product is obtained. It is another object of this invention to contemporaneously with the increased yield of a higher purity product, reduce the overall cost of said system. Another object of this invention is to provide new and improved method and apparatus for the production of high octane hydrocarbons. Another object of this invention is to provide a method and apparatus wherein there is provide an improved efficiency of feed stocks utilization thereby reducing operating costs per unit of production.

Other aspects, objects and the several advantages of the invention are apparent from a study of this disclosure, the drawings and the appended claims.

According to this invention there is provided a method and apparatus wherein a suitable hydrocarbon feed, for example crude oil or other hexane-containing petroleum fraction, is concentrated by known methods, e.g. fractionation. The concentrate can be any hydrocarbon material; for example, the concentrate can have at least 50 volume percent of hydrocarbon constituents which have 6 carbon atoms per molecule. The concentrate is then hydrogenated to convert undesirable unsaturated hydrocarbons such as benzene into more desirable or at least more adaptable saturated hydrocarbons. After this the hydrogenated material is treated to a fixed bed isomerization operation wherein less desirable hydrocarbons, e.g., normal hexane, are formed into more desirable higher octane constituents such as isohexanes. The more desirable high octane constituents are separated from the isomerized material and the isomerized material is then further treated to an aluminum halide-hydrocarbon complex isomerization operation to convert certain hydrocarbons, e.g., methylcyclopentane, present into the desired end product, e.g., cyclohexane. This second isomerized material is then further treated, for example by fractionation, to first remove materials boiling at a lower temperature than said desired product and then removing said desired product from materials boiling at a higher temperature.

According to this invention there is further provided a process and apparatus wherein the hydrogenation and first isomerization operations are carried out in the same reaction system in that said concentrate is first passed through a guard chamber filled with spent nickel catalyst and then into a hydrogenation operation and the hydrogenated material is then subject to an isomerization operation. The isomerized material is then subjected to a stabilization operation or separation operation or both. Stabilized product which is free of unsaturated hydrocarbons is subjected to removal therefrom of high octane constituents and further isomerization and separation treatments as discussed above. Hydrogen is removed by flashing the reactor effluent and is recycled, e.g., to said guard chamber in admixture with the feed, for reuse in the system.

FIGURE 1 of the drawing is a schematic representation of a known process which is significantly improved by the instant invention.

Figure 2:
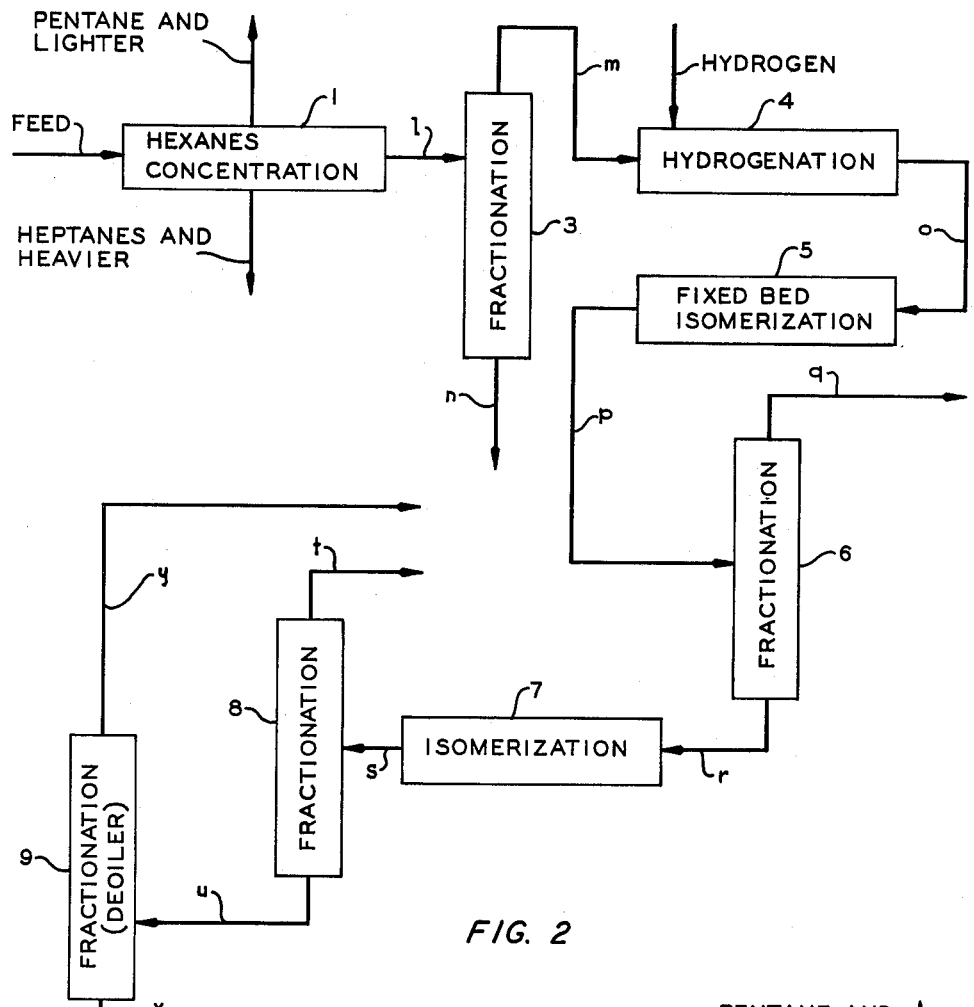

FIGURE 2 of the drawing is a schematic representation of the overall aspects of the instant invention.

Figure 3:
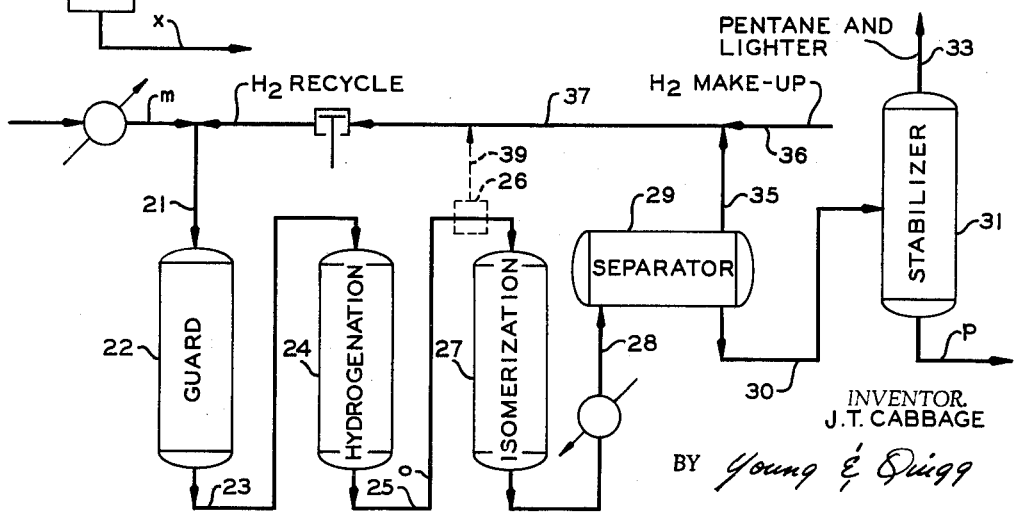

FIGURE 3 of the drawing is a second schematic representation describing the situation wherein the hydrogenation and first isomerization operations are carried out in the same reaction system.

Referring to FIGURE 1, hydrocarbon feed is concentrated at 1 to produce a hexanes-containing, i.e., containing hydrocarbon constituents which have 6 carbon atoms, concentrate, which concentrate is passed by A to deisohexanizer 2. An isohexanes-containing stream is removed by way of B, since isohexane serves herein neither to promote nor retard desirable reactions, but merely loads the equipment. The concentrate then passes by C to a demethylcyclopentanizing operation 3 in which substantially all materials higher boiling than the primary reactant, e.g., methylcyclopentane, are removed. Such higher boiling materials include 2,2- and 2,4-dimethylpentanes and naturally occurring cyclohexane. Concentrate then passes by D to a benzene hydrogenation zone 4 which converts benzene remaining in the methylcyclopentane and normal hexane mixture into cyclohexane to prevent deactivation of the aluminum halide complex catalyst utilized in the aluminum halide complex isomerization operation 7. The hydrogenated product which comprises primarily normal hexane, methylcyclopentane and cyclohexane passes by F to aluminum chloride complex isomerization operation 7 wherein methylcyclopentane is converted to cyclohexane at equilibrium concentrations equalling approximately 75 mol percent cyclohexane, and normal hexane is converted to isohexanes at approximately 50 to 60 mol percent conversion. The isomerized material then passes by G to demethylcyclopentanizing operation 8 wherein methylcyclopentane, isohexanes, and normal hexane by way of H are separated from cyclohexane. A cyclohexane-containing fraction passes from demethylcyclopentanizer 8 by I to a deoiling operation, i.e., fractionation, 9 in which higher boiling impurity constituents are removed by way of K from the cyclohexane, and a relatively pure cyclohexane product recovered by way of J.

Referring to FIGURE 2, a suitable hydrocarbon feed is treated by known methods at 1 to produce a hexanes-containing concentrate. The hexanes-containing concentrate passes by L to the demethylcyclopentanization operation 3 in which by way of N 2,2- and 2,4-dimethylpentanes are removed from said concentrate which then passes by M to benzene hydrogenation operation 4. It should be noted that the concentrate in line M contains all of the isohexanes or a substantial portion which are present in the feed L. This is to be distinguished from the concentrate in line D of FIGURE 1 from which a substantial amount of isohexanes has been removed. Also, in FIGURE 1 the benzene hydrogenation operation 4 requires an internal cooled recycle stream 10 to serve as the heat carrier. It has been found that in FIGURE 2 an internal recycle stream is not required, since the concentrate in line M contains isohexanes which serve as a heat carrier. Thus, the apparatus of the hydrogenation operation 4 is, by the instant invention, simplified and, therefore rather less costly.

In the hydrogenation unit 4 the normal hexane and methylcyclopentane containing feed M is contacted with hydrogen in the presence of a hydrogenation catalyst whereby the unsaturated materials, such as benzene, present in the feed are converted to saturated materials, such as cyclohexane. If nickel catalyst is used, organic sulfur compounds react with the spent nickel hydrogenation catalyst in the guard unit 22 of FIGURE 3. The sulfur-free feed is then charged to a reactor containing active nickel hydrogenation catalyst. In order to provide continuous operation, it is therefore desirable to provide a plurality of reactors arranged so that the flow therethrough can be in series or in parallel, depending on whether or not a reactor is withdrawn from service and the oldest unit can be used as a guard chamber. Various hydrogenation catalysts can be employed including such materials as nickel, platinum, and palladium, associated with supporting materials such as silica, alumina, kieselguhr and various synthetic and natural clays. When a nickel catalyst is utilized, any sulfur present in the feed reacts with the spent nickel catalyst in the guard chamber thereby converting the catalyst to nickel sulfide.

The hydrogenated material passes by O through a fixed bed isomerization process which utilizes a suitable catalyst, e.g., platinum on a support, or other catalyst, modified to reduce the activity thereof, if necessary, to convert normal hexane to isohexanes at relatively elevated temperatures, i.e., 350° to 500° F. It is desirable that the equilibrium reaction conditions achieved in this operation be such that a 70 to 80 mol percent concentration of isohexanes be reached thus converting a substantial part of the normal hexane present in said hydrogenated material to isohexanes of high octane value. This isomerization is preferably effected in the presence of a platinum-type catalyst, such as the Butamer catalyst. Penex catalyst can be used. Other fixed bed isomerization catalysts include those containing alumina and minor amounts of a metal of the platinum group such as ruthenium, rhodium, palladium, osmium, iridium, and platinum promoted by a minor amount of the combined halogen. Preferably, the catalyst comprises a composite of alumina and platinum with the platinum being in a concentration of from about 0.01 to about 5 percent by weight of the catalyst and more particularly the composite of aluminum, platinum and combined halogen, preferably fluorine, the platinum being a concentration of from about 0.1 to about 3 percent by weight and the halogen being in a concentration of from about 0.2 to about 5 percent by weight of the final catalyst. Other suitable platinum-containing catalysts comprise composites of platinum-silica, platinum-silica-alumina, platinum-silica-zirconia, platinum-silica-alumina-zirconia, platinum-silica-thoria, platinum-silica-alumina-thoria, platinum-silica-magnesia, platinum-silica-alumina-magnesia, and the like. The catalysts may be in the form of a powder or larger size granules or irregular size and shape, but preferably in the form of particles of uniform size and shape as obtained by pilling, extruding oil drop method, and the like. The conditions within the isomerization operation are maintained such as to permit the conversion of a substantial amount of normal hexane present to isohexanes as described above relative to equilibrium concentrations. It should be noted that little or no benzene is produced in this isomerization operation because of the low temperature of activation of the catalyst used. In addition, it should be noted that the process conditions required for the catalyst used in this operation are compatible with conditions used with the catalyst, e.g., nickel or kieselguhr, used in the hydrogenation operation 4. Thus, since the catalyst of operations 4 and 5 are compatible, combination of same into a single reaction system is feasible including the same hydrogen circulation and stabilization system, and is even desirable, and is disclosed in more detail in FIGURE 3.

The isomerization effluent from 5 passes by P into a deisohexanizing operation 6 wherein isohexanes and other high octane constituents are removed by way of Q for use in blending with other motor fuel materials to produce a high quality motor fuel, i.e., improved octane gasoline. The Research Octane Number with 3 cc. TEL for the isohexanes recovered is on the average about 101.

Since a very large part of normal hexane is converted to isohexanes in 5 and since a great portion of isohexanes are removed in 6, a significantly smaller total quantity of material passes from 6 through R to aluminum halide-hydrocarbon complex isomerization operation 7. However, it is important to note that although the total quantity of material passing through R is smaller the same or even larger amount of desirable material, e.g., methylcyclopentane, is still present in R. Thus, the overall load on the system and primarily on the most expensive operations of that system, i.e., aluminum halide complex isomerization, is significantly reduced without reducing and usually even increasing the amount of desirable material to be treated in 7 and ultimately recovered at Y as the product of the process.

As stated above, deisohexanized isomerization effluent is passed by R to the aluminum halide complex isomerization operation 7 wherein methylcyclopentane is converted to cyclohexane.

The aluminum halide complex isomerization of the hydrocarbons such as normal hexane and methylcyclopentane in the process of this invention is generally carried out at a temperature of between about 120° F. and about 170° F., preferably 140° F. to 150° F. Equilibrium concentrations of cyclohexane and isohexanes in methylcyclopentane and normal hexane, respectively, are favored by low temperatures; however, the conversion of normal hexane to isohexane at low temperature does not occur within a reasonable time. At 50° F., the cyclohexane equilibrium (90 mol percent) is attained in about 15 minutes; at 50° F., the isohexanes equilibrium (99 mol percent) is not obtained, and after 15 minutes only about 5 mol percent isohexanes is produced from normal hexane. At 150° F. the cyclohexane equilibrium (76 mol percent) is of course reached in 15 minutes; and at 150° F. the isohexanes equilibrium (96 mol percent) is not attained, but the higher temperature speeds up the conversion toward equilibrium and 40 to 50 mol percent isohexanes is produced from normal hexane. The isomerization reaction is preferably carried out under sufficient pressure to provide a liquid phase reaction, namely a pressure in the range of between about 150 to 300 p.s.i.g. The contact or residence time of the reactants in the reactor varies usually between about 0.1 and about 5 hours.

The catalysts employed in carrying out the isomerization reaction comprise metal halides, such as aluminum chloride, aluminum bromide, boron trifluoride and the halides of such metals as zinc, tin, arsenic, antimony, zirconium, beryllium, titanium, iron and the like. These catalysts are especially effective when present as complexes which are formed by interaction between the metal halides and hydrocarbons present in the reaction system. A particularly desirable isomerization catalyst is the complex of hydrocarbon with aluminum chloride. The process for aluminum chloride complex catalyst isomerization of methylcyclopentane to high purity cyclohexane depends on the very active catalytic properties of the complex at the above-mentioned relatively low temperatures, where the equilibrium is strongly in favor of cyclohexane, i.e., the above 70–80 mol percent cyclohexane. In addition to the catalyst it is desirable that the corresponding hydrogen halide be present in the reaction zone since this material maintains catalyst activity at a high level. The reaction rate and the conversion of the hydrocarbon feed is dependent on the amount of aluminum chloride in the aluminum chloride-hydrocarbon complex. Thus, to maintain a hexane conversion of about 55 percent, the catalyst complex should contain 60 to 62 percent aluminum chloride. However, the quantity of aluminum chloride in the complex can be varied over wide ranges to provide a corresponding range of feed reactant conversion. While the overall activity of the catalyst is established by the aluminum chloride content, as stated, the presence of hydrogen chloride is required to provide a high activity. Usually the quantity of hydrogen chloride present is between about 2 to about 6 weight percent of the feed with about 4 weight percent being preferred. The hydrocarbon-to-catalyst ratio is also an important factor in the isomerization rate and generally this ratio is maintained between about 0.8:1 and about 1.4:1 although ratios as high as 5 to 1 can be used if reaction temperatures are increased.

The isomerization effluent from 7 passes by S to fractionator 8 in which lower boiling methylcyclopentane, isohexane and normal hexanes are removed by way of T from cyclohexane containing portions of said isomerization effluent which portion then passes by U to fractionator 9 (deoiler) in which a high yield of very pure cyclohexane is obtained by way of Y by separating said cyclohexane from higher boiling constituents which are removed by line X.

It should be noted that in operation 1, in FIGURE 2, besides the removal of hydrocarbons having 5 carbon atoms or less and hydrocarbons having 7 carbon atoms and more, there can be effected a partial deisohexanizing in order to allow for more conversion of normal hexane to isohexane in subsequent fixed bed isomerization operation 5.

Referring to FIGURE 3, concentrate in line M passes to line 21 and then to guard chamber 22 which can be any type of guard chamber known, such as the oldest in use hydrogenation reactor. The effluent from guard chamber 22 passes by 23 to benzene hydrogenator 24 and the hydrogenated material passes by 25 to fixed bed isomerization operation 27. The isomerizate passes by 28 to separator 29 wherein hydrogen is separated therefrom and passed by 35, 37 and 21 back to guard chamber 22. The effluent isomerized material from separator 29 then passes by 30 to stabilizer 31, e.g., fractionator, wherein additional hydrogen along with light hydrocarbons is removed by 33. The benzene-free product passes from stabilizer 31 by P to deisohexanizer 6 of FIGURE 2. It should be noted that, if desired, hydrogen may be separated prior to isomerization in 27 by insertion of a separator 26 in line 25 and transfer of hydrogen involved in separator 26 to guard chamber 22 by means of lines 39, 37 and 21.

EXAMPLE

A suitable hydrocarbon feed, the composition of which is set forth in Table I, was treated in accordance with the process as set forth in FIGURE 1 and explained above. Material balance for the process of FIGURE 1 was as follows:

Table I

|  | LV, percent | A B/D | B B/D | C B/D | D B/D | E B/D | F B/D | G B/D | H B/D | I B/D | J B/D | K B/D |
|---|---|---|---|---|---|---|---|---|---|---|---|---|
| Pentane & lighter | 2.4 | 168 | 168 |  |  |  |  |  |  |  |  |  |
| Isohexanes | 26.7 | 1,869 | 1,418 | 451 | 451 |  | 451 | 1,582 | 1,582 |  |  |  |
| n-Hexane | 37.6 | 2,632 | 368 | 2,264 | 2,262 | 2 | 2,262 | 1,131 | 1,131 |  |  |  |
| Methylcyclopentane | 14.6 | 1,043 | 2 | 1,041 | 1,010 | 31 | 1,010 | 355 | 354 | 1 | 1 |  |
| Dimethylpentanes | 1.7 | 119 |  | 119 | 12 | 107 | 12 | 12 |  | 12 | 12 |  |
| Benzene | 5.1 | 357 | 37 | 320 | 317 | 3 |  |  |  |  |  |  |
| Cyclohexane | 9.0 | 630 |  | 630 | 31 | 599 | 411 | 1,065 | 20 | 1,045 | 1,045 |  |
| Heptanes and heavier | 2.6 | 182 |  | 182 |  | 182 |  | 1 |  | 1 |  | 1 |
| Totals | 100.0 | 7,000 | [1] 1,993 | 5,007 | 4,085 | 924 | 4,146 | 4,146 | [2] 3,087 | 1,059 | [3] 1,058 | 1 |

LV percent, means liquid volume percent.
B/D, means barrels per day.
[1] 71.15% Isohexanes.
[2] 51.25% Isohexanes.
[3] 98.77% Cyclohexane.

From Table I it can be seen that the process of FIGURE 1 produced 1,059 barrels per day of product cyclohexane of purity 98.77 volume percent. It can also be seen from Table I that the process produced 1,418 barrels per day of isohexane via line B and 1,582 barrels per day of isohexane via line H thereby providing a total yield of isohexane of 3,000 barrels per day.

A hydrocarbon feed identical to that utilized in the process of FIGURE 1 was utilized in the process of FIGURE 2 with the following results:

Table II

|  | LV, percent | L B/D | M B/D | N B/D | O B/D | P B/D | Q B/D | R B/D | S B/D | T B/D | U B/D | V B/D | X B/D |
|---|---|---|---|---|---|---|---|---|---|---|---|---|---|
| Pentane & lighter | 2.4 | 168 | 168 |  | 168 | 150 | 150 |  |  |  |  |  |  |
| Isohexanes | 26.7 | 1,869 | 1,869 |  | 1,869 | 3,373 | 2,563 | 810 | 1,294 | 1,294 |  |  |  |
| n-Hexane | 37.6 | 2,632 | 2,629 | 3 | 2,629 | 1,125 | 157 | 968 | 484 | 484 |  |  |  |
| Methylcyclopentane | 14.9 | 1,043 | 1,012 | 31 | 1,012 | 1,027 | 2 | 1,025 | 366 | 365 | 1 | 1 |  |
| Dimethylpentanes | 1.7 | 119 | 12 | 107 | 12 | 12 |  | 12 | 12 | 12 | 12 | 12 |  |
| Benzene | 5.1 | 357 | 354 | 3 |  |  |  |  |  |  |  |  |  |
| Cyclohexane | 9.0 | 630 | 31 | 599 | 455 | 440 |  | 440 | 1,098 | 20 | 1,078 | 1,078 |  |
| Heptanes and heavier | 2.6 | 182 |  | 182 |  |  |  |  |  | 1 |  |  | 1 |
| Totals | 100.0 | 7,000 | 6,075 | 925 | 6,145 | 6,127 | ¹ 2,872 | 3,255 | 3,255 | 2,163 | 1,092 | ² 1,091 | 1 |

LV percent, means liquid volume percent.
B/D, means barrel per day.
¹ 89.24% Isohexanes.
² 98.81% Cyclohexane.

As can be seen from Table II, the process of FIGURE 2 produced 1,091 barrels per day of cyclohexane product with a purity of 98.81 volume percent. This is to be compared with the 1,058 barrels per day of cyclohexane product with a purity of 98.77 volume percent of the process of FIGURE 1, thus it is clearly shown that the process of the invention increased the yield of cyclohexane product by about 3 percent. Also, the cyclohexane product of Table II had a purity of 98.81 volume percent, which indicates that not only is there a higher yield by the process of this invention but also the product is more pure.

It can also be seen from Table II that 2,563 barrels per day of isohexanes was produced from line Q and 1,294 barrels per day of isohexanes were produced via line T thereby producing a total isohexanes yield of 3,857 barrels per day. This is to be compared with the total isohexanes yield of the process of FIGURE 1 of 3,000 barrels per day via B and H, and clearly shows an 857 barrels per day over approximately 30 percent increase in yield of isohexanes by this invention. The isohexanes product produced by this invention has a Research Octane Number with 3 cc. of TEL of 98.

It is important to note that the total barrels per day of material in line R of FIGURE 2 which passes through aluminum halide complex isomerization operation 7 is 3,255 while the total barrels per day of material flowing through line F in FIGURE 1 to aluminum chloride-hydrocarbon complex isomerization operation 7 is 4,146. Thus, it is clearly shown that a significant decrease in load is placed upon the aluminum halide complex isomerization operation, which operation is the most expensive operation of the system, and therefore a large fiscal savings can be realized not only in the reduced operating costs but also in the reduced initial investment in the aluminum halide complex isomerization apparatus since the apparatus can be of a smaller size due to the lesser load thereon. It should also be noted that if the apparatus which utilizes an aluminum halide complex isomerization operation 7 is not reduced in overall size then the rate of flow of charge thereto and the quantity of normal hexane and methylcyclopentane isomerized to isohexanes and cyclohexanes, respectively, will be significantly increased.

Similar results are obtained when the system of FIGURE 3 is utilized in the system of FIGURE 2 in lieu of elements 4 and 5.

Reasonable variations and modifications of this invention can be made, or followed, in view of the foregoing, without departing from the spirit or scope thereof.

That which is claimed is:

1. A method for producing a cycloparaffin comprising providing a hydrocarbon feed which has from 50 to 100 volume percent of aromatic, isoparaffin, n-paraffin and isocyclic hydrocarbon constituents each having 6 carbon atoms, contacting said feed with hydrogen in the presence of a hydrogenation catalyst to convert unsaturated constituents to saturated constituents and thereby produce a hydrogenated product, heating the hydrogenated product at an elevated temperature in the presence of a fixed bed isomerization catalyst and under reaction conditions which favor the conversion of normal paraffins to isoparaffins and thereby produce a first isomerization product rich in isoparaffins, fractionating said first isomerization product to remove therefrom lower boiling isoparaffins and thereby produce an isoparaffin lean product, reacting said isoparaffin lean product in the presence of an aluminum halide-complex isomerization catalyst and under reaction conditions which favor the conversion of isocyclic constituents to cycloparaffins and thereby produce a second isomerization product rich in cycloparaffins, and separating from said second isomerization product cycloparaffins as a product of the method.

2. A method for producing a pure cycloparaffin comprising providing a hydrocarbon feed composed in from 50 to 100 volume percent of isohexanes, n-hexane, dimethylpentanes, methylcyclopentane and benzene, contacting said feed with hydrogen in the presence of a hydrogenation catalyst to convert benzene to cyclohexane and thereby produce a hydrogenated product, heating the hydrogenated product at an elevated temperature in the presence of an isomerization catalyst and under reaction conditions which favor the conversion of normal hexanes to high octane isohexanes and thereby produce a first isomerization product rich in isohexanes, heating said first isomerization product to remove therefrom lower boiling isoparaffins to thereby produce an isoparaffin-lead product, reacting said isoparaffin-lean product in the presence of an aluminum halide-complex isomerization catalyst and under reaction conditions which favor the conversion of methylcyclopentane to cyclohexanes and thereby produce a second isomerization product rich in cyclohexanes, and separating from said isomerization product cyclohexanes as a product of the method.

3. The process of claim 2 wherein said fixed bed isomerizing utilizes a platinum catalyst in the range of 350 to 500° F. and said second isomerizing utilizes an aluminum halide complex catalyst in the range of 120 to 170° F.

4. The process of claim 3 wherein said aluminum halide is aluminum chloride and the temperature is in the range of 140 to 150° F.

5. The process of claim 2 wherein said feed is fractionated to separate therefrom dimethylpentanes and other hydrocarbons tenaciously associated therewith, wherein said second isomerization product is first fractionated to remove therefrom materials boiling lower than cyclohexane and secondly fractionated to remove cyclohexane from higher boiling materials present.

6. The process of claim 2 wherein the hydrogenating and first isomerizing comprise a unitary reaction system wherein hydrogen is removed only from said first isomerization product thereby stabilizing said isomerization product.

References Cited by the Examiner

UNITED STATES PATENTS

| | | | |
|---|---|---|---|
| 2,939,896 | 6/1960 | Myers | 260—683.68 |
| 2,953,606 | 9/1960 | Dean et al. | 260—666 |
| 3,009,002 | 11/1961 | Kron | 260—666 |
| 3,054,832 | 9/1962 | Cabbage | 260—666 |
| 3,078,323 | 2/1963 | Kline et al. | 260—683.73 |

DELBERT E. GANTZ, *Primary Examiner.*

V. O'KEEFE, *Assistant Examiner.*